2,788,267
CYCLONE SEPARATOR FEEDER AND METHOD FOR FEEDING CARBON BLACK

Harold A. Larson and Lawrence C. Keaton, Borger, Tex., assignors to Phillips Petroleum Company, a corporation of Delaware Application January 13, 1954, Serial No. 403,748

15 Claims. (Cl. 23—314)

This invention relates to a method of withdrawing material from a fluid-solids system. In one of its aspects, it relates to a method of feeding carbon black to a pelleting mill. In another of its aspects, it relates to an apparatus for feeding carbon black.

There are many methods for producing carbon black known in the art. In general, carbon black is produced by the incomplete combustion of a petroleum product in a carbon black reactor. That is, the petroleum is burned with a deficiency of air so as to cause the production of smoke. The properties (hardness, fineness, density, color, etc.) of the resulting carbon black are controlled by selecting the proper fuel and burning conditions. The resulting carbon black is collected by means of air separators, mechanical separators, bag filters, and the like. The production of carbon black is well known in the art and requires no further discussion here.

Carbon black is extremely fine and, consequently, very difficult to contain. In order to conveniently ship and handle carbon black, it is often pelletized before packaging. As has been hereinbefore said, carbon black is extremely fine. Consequently, the material is very difficult to handle. When mixed with a gas, such as air, it becomes very free-flowing, almost like a liquid, such as water, yet it will pack in close places and cannot be conveniently controlled by valves which are applicable to liquid flow control. When transported by means of a screw conveyor, the material has a tendency to fluff up and run over the top of the conveyor. One convenient way of handling carbon black is to mix it with air as a suspension, so that it can be pumped or blown in much the same manner as a fluid. Due to these difficulties in conveying carbon black, it has been extremely difficult to feed a plurality of pelleting mills or other processing mills at equal rates from a common source. As a result, some pelleting mills will be overloaded, while others are running at a very small percentage of their capacity. The same difficulties will also be encountered in feeding carbon black to bag loading machines and other processing equipment.

We have discovered a relatively simple means for withdrawing material from a fluid-solids system through a plurality of conduits at substantially equal rates.

An object of our invention is to provide a method of dividing a fluid-solids stream into a plurality of streams having a predetermined weight ratio of solids. Another object is to provide a method of feeding fluid-suspended solid at substantially equal rates to a plurality of processing machines. Still another object is to provide an apparatus for feeding carbon black to a plurality of pelleting machines at substantially equal rates. Other objects and advantages of our invention will be obvious to those skilled in the art upon reading this disclosure and the attached claims.

In accordance with our process, a finely divided solid is entrained in a fluid by means of a blower or other means and is blown into a manifold or conduit. A plurality of cyclone separators are connected with their inlets to the said manifold. The pressure drops across the cyclone separators are regulated, thereby causing a predetermined weight of the entrained solids to be drawn into each cyclone per unit time. Most of the solids settle out in the cyclone and the gas, with a small amount of solids, is returned to a surge tank ahead of the entraining means.

Our invention will be further described by referring to the attached drawing which is made a part of this specification. We will describe an embodiment of our invention wherein carbon black is being fed to pelleting mills. It should be understood that our invention is not limited to this embodiment but may be used on any fluid-solids material. Examples of such materials are cement, lime, catalyst materials, and the like.

Figure 1:
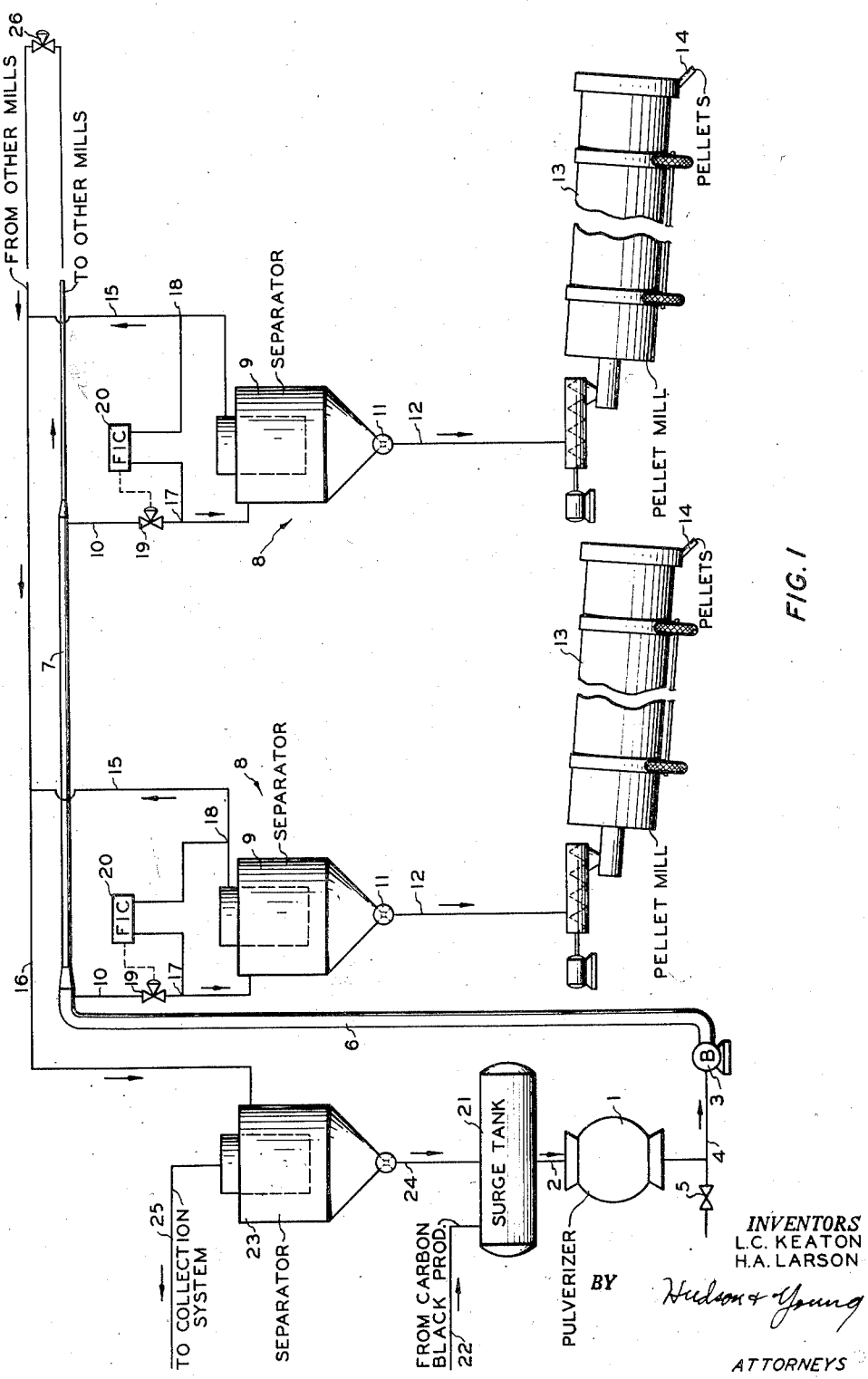
Figure 1 is a schematic showing of an embodiment of our invention wherein carbon black is being pelletized and the returned carbon black is separated out.

Referring to the drawing, carbon black from the collection system, i. e., bag filters, separators and the like, in a carbon black production plant is fed to a surge tank 21 via conduit 22. The carbon black from the surge tank then passes to pulverizer 1 via conduit 2 where any large particles, generally due to agglomeration, are thoroughly broken up. The carbon black is then sucked into pump or blower 3 via conduit 4. Bleed valve 5 is provided to admit air as a carrier. The pulverizer is generally of the hammer mill type such as a "Mikro-Pulverizer." In pump or blower 3, the carbon black is suspended in air by mixing with air after which it is blown or pumped to manifold or header conduit 7 via conduit 6. In general, the carbon black to air load will vary in the range of 200 to 1,000 grains of carbon black per cubic foot of air. The amount of air and carbon black will, of course, depend upon the number of separators and processing mills and upon the capacity or requirements of said mills. The conduits 6 and 7 will be so designed that the air carbon black velocity will not be less than that at which the carbon black will settle out or about 50 feet per second and generally higher. The diameter of conduit 7 can be stepped down between each take-off conduit 10 in order to maintain this minimum velocity.

A plurality of separators 8 are operatively connected with their intake to the said manifold 7. The carbon black from manifold 7 passes to each separator 9 via one of a plurality of conduits 10. Most of the carbon black settles in separator 9 and is removed via star valve 11 and conduit 12 which feeds the respective pellet mills 13 where the carbon black is pelletized. The finished pellets are removed from the mill via the respective conduits 14.

While most of the carbon black is removed from the gas in the separators 9, a small part of this material remains in the gas and is removed therewith from the separators 9 via the respective conduits 15 to return header 16. These conduits, like conduits 6 and 7, will also be designed to have an air velocity of about 50 feet per second. This gas is then passed to separator 23 where more carbon black separates out and is returned to surge tank 21 via conduit 24. The gas with a small amount of carbon black then goes to the carbon black collection system, i. e. bag filters, via conduit 25. By the use of the collection system as shown, the fine circulating carbon black is allowed to settle out and is mixed in the surge tank and pulverized with fresh carbon black from the production system.

Figure 2:
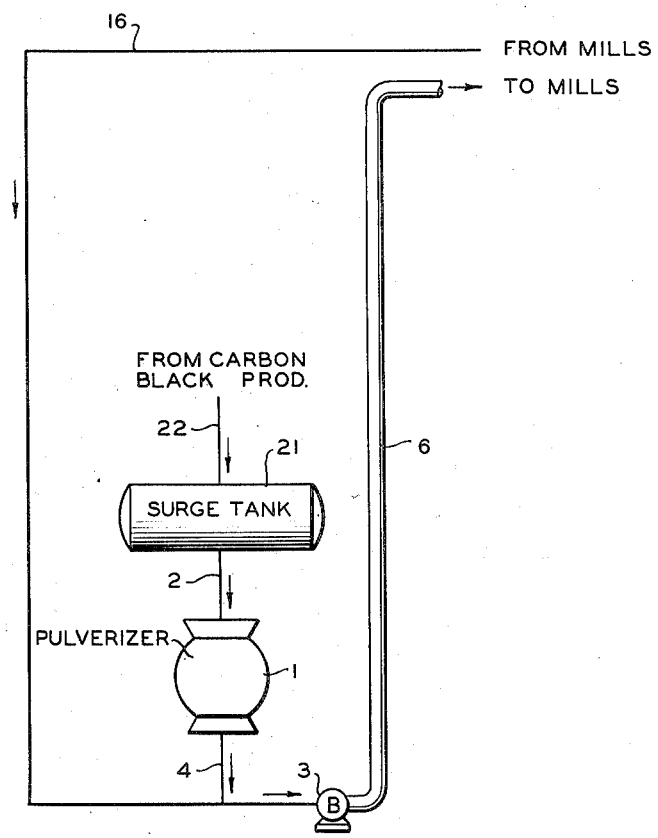
Figure 2 is a schematic showing of an embodiment of our invention wherein the carrying gas is recirculated.

Figure 2 shows a modification wherein the separator 23 is not used. Referring to this drawing, the gas in conduits 16 is returned to the blower 3. Conduit 4 from the pulverizer enters conduits 16 and the circulative gas picks up the carbon black carrying it to the blower 3 and header 7 as previously described.

The pressure drop from a position 17 in the inlet conduit of each separator 9 to a position 18 in the exhaust of the said separator is regulated by means of a damper or butterfly valve 19. The flow indicator control 20 has a pressure sensing element operatively connected to the inlet conduit 10 at a position 17 between the butterfly valve 19 and the separator and another such sensing element connected to the exhaust conduit of the separator at a position 18 so that controller 20 is responsive to the pressure drop from positions 17 to 18. The flow indicator control 20 is operatively connected to butterfly valve 19 and opens or closes that valve responsive to the pressure drop between the two positions, thereby maintaining that pressure drop at some predetermined value. By setting each flow indicator control 20 to maintain the same pressure drop across the individual separators 9, the flow of material to each separator will be substantially the same. The pressure drop from 17 to 18 will generally be maintained in the range of 3 to 12 inches of water and preferably between 3 and 4 inches of water.

While we have shown only two such separators, it is contemplated that generally more than two such separators will be connected to the manifold. Each of the several separators 8 will be connected and operated in the same manner as was described for separator 9. The manifold 7 and the return conduit 16 can be connected at their ends through a pressure regulator 26. This has the advantage over closed end conduits in that by maintaining a constant pressure on manifold 7, a constant flow will be obtained to each separator 9 and provides for returning excess carbon black to the system, for example, when one or more separations are shut down.

We have described our invention in one of its preferred embodiments, however, we are not limited to that embodiment. For example, instead of pelleting mills, we can use a loose carbon bagging machine as the further processing equipment. We have described our invention in an embodiment wherein equal weights of solids are fed to each processing mill, however, any other ratio of solids can be used. Those skilled in the art will see many variations which can be made without departing from the scope of our invention.

We claim:

1. A method of separating a fluid-solids stream into a plurality of streams having a predetermined relationship one to the other, the said method comprising passing a fluid-solids stream to a manifold, withdrawing a plurality of fluid-solids streams from said manifold and passing said streams respectively through a plurality of separation zones, continually detecting pressure drop across said separating zones, regulating the rate of flow of the said streams responsive to changes in said pressure drop to maintain a predetermined pressure drop across the said separation zones, and separating fluids from solids in the said separation zones.

2. A method of feeding finely divided solids at a predetermined rate ratio to a plurality of processing mills, the said method comprising suspending the finely divided solids in air in an entraining zone, withdrawing a stream of suspended solids from said entraining zone, passing portions of said stream respectively through a plurality of separating zones, continually detecting pressure drop across said separating zones, regulating the rate of flow of each portion through its associated separating zone responsive to changes in said pressure drop to maintain the pressure drop across such separating zone at a predetermined value so as to provide a predetermined relationship among the several portions of said stream, separating the solids from the air in each said separating zone, withdrawing the separated solids from each separating zone, feeding the said processing mills respectively with said withdrawn solids, withdrawing air from each separating zone and passing said air thus withdrawn from all of the separating zones to a separator wherein additional solids are separated out.

3. A method of feeding finely divided solids at a predetermined rate ratio to a plurality of processing mills, the said method comprising suspending the finely divided solids in air in an entraining zone, withdrawing a stream of suspended solids from said entraining zone, passing portions of said stream respectively through a plurality of separating zones, continually detecting pressure drop across each separating zone, regulating the rate of flow of each portion through its associated separating zone responsive to said pressure drop to maintain the pressure drop across such separating zone at a predetermined value so as to provide a predetermined relationship among the several portions of said stream, separating the solids from the air in each said separating zone, withdrawing the separated solids from each separating zone, feeding the said processing mills respectively with said withdrawn solids, withdrawing air from each separating zone and returning the said withdrawn air to the inlet of said entraining zone.

4. A process for feeding a plurality of processing mills with substantially equal amounts of finely divided solids, the said process comprising passing finely divided solids along with air through an entraining zone wherein the solids are entrained in air, passing the said entrained solids to a manifold, maintaining the velocity in said manifold at not less than a predetermined minimum, withdrawing a plurality of streams of fluidized solids from said manifold, passing the said streams respectively to separating zones, separately sensing the pressure drop across each said separating zone, regulating the flows of said plurality of fluidized solids streams respectively responsive to the pressure drops across the respective separating zones to provide an equal pressure drop across each separating zone, separating the solids from the air in said separating zones, withdrawing air from said separating zones, withdrawing solids from the said separating zones, and feeding a plurality of processing machines respectively with the said withdrawn solids.

5. The process of claim 3 wherein the suspended solids is 200 to 1,000 grains of carbon black per cubic foot of air and the predetermined minimum velocity is 50 feet per second.

6. The process of claim 4 wherein the processing mills are pelleting mills.

7. A method of feeding finely divided solids at a predetermined rate ratio to a plurality of processing mills, the said method comprising suspending the finely divided solids in air in an entraining zone, withdrawing a stream of entrained solids from said entraining zone, withdrawing a portion of said stream of entrained solids from said stream, reducing the cross-sectional area of the remaining stream of entrained solids, withdrawing further portions of said stream, maintaining the velocity of the first said stream greater than a predetermined minimum, passing each said portion through a separating zone associated therewith, continually detecting the pressure drop across each said separating zone, regulating the rate of flow of each portion through its associated separating zone to maintain the pressure drop across such separating zone at a predetermined value responsive to changes in said pressure drop so as to provide a predetermined relationship among the several portions of said stream, separating the solids from the air in each said separating zone, withdrawing the separated solids from each separating zone, feeding a processing mill associated with each separating zone with the solids withdrawn from the said associated separating zone, withdrawing air from part of said separating zones to form an air stream, withdrawing air from remaining separating zone, introducing the last said withdrawn air to the said air stream, enlarging the cross-sectional area of the said air stream, and passing the said air stream to a separator wherein additional carbon black is removed.

8. An apparatus for feeding substantially equal amounts of a finely divided gas entrained solids to a plurality of processing mills, said apparatus comprising in combination a manifold, a plurality of cyclone separators, a plurality of conduit means connecting the respective inlets of the said separators with said manifold, a plurality of means for detecting and regulating the pressure drop across each respective separator and operatively connected therewith, a gas outlet conduit from each separator, a solids outlet means from each separator, a plurality of processing mills, and solids outlet conduits from said separators connecting them to the respective processing mills.

9. An apparatus for feeding predetermined ratios of finely divided solids to a plurality of processing mills, the said apparatus comprising in combination a gas pump, a manifold, an inlet conduit to said pump, a conduit means connecting the outlet of said pump to the inlet of said manifold, a plurality of cyclone separators, a plurality of conduit means connecting said manifold respectively with said separators, a separate means for detecting and controlling the pressure drop across each of said separators and operatively connected therewith, the said controlling means being set to control the rate of feed to the said separators responsive to changes in said pressure drop so as to maintain a predetermined pressure drop across the said separators, a return conduit communicating with a solids collection system pump, gas outlet conduits connecting the respective gas outlets of said separators and the said return conduit, a plurality of processing mills, and solids outlet conduits from said separators connected to the inlets of said processing mills, respectively.

10. An apparatus for feeding predetermined ratios of finely divided solids to a plurality of processing mills, the said apparatus comprising in combination an entraining pump, a manifold, an inlet conduit to said pump, a conduit means connecting the outlet of said pump to the inlet of said manifold, a plurality of cyclone separators, a plurality of conduit means connecting said manifold respectively with said separators, a separate means for detecting and controlling the pressure drop across each of said separators and operatively connected therewith, the said controlling means being set to control the rate of feed to the said separators responsive to changes in said pressure drop so as to maintain a predetermined pressure drop across the said separators, a return conduit communicating with the inlet conduit of the said pump, gas outlet conduits connecting the respective gas outlets of said separators and the said return conduit, a plurality of processing mills, and solids outlet conduits from said separators connected to the inlets of said processing mills, respectively.

11. An apparatus for feeding a plurality of processing mills with substantially equal amounts of finely divided solids, the said apparatus comprising in combination a gas pump, a manifold, an inlet conduit to said pump, a conduit means connecting the outlet of said pump to the inlet of said manifold, a plurality of cyclone separators, conduit means connecting the respective inlets of said separators with said manifold, a damper operatively installed in each of last said conduit means, a separate pressure sensing means operatively connected to sense the inlet pressure of each separator, a separate pressure sensing means operatively connected to sense the gas outlet pressure of each separator, a control means responsive to the pressure difference between the inlet and outlet of the said separator and operatively connected to the said damper to open and close said damper responsive to changes in said pressure differences so as to provide a predetermined pressure drop across the said separator, the said predetermined pressure drop being substantially equal for all of the said plurality of separators, a return conduit for withdrawing gas, a gas outlet conduit from each of said separators to the said return conduit, and a solids outlet from each of said separators to a said process mill, each separator being connected to a different processing mill.

12. The apparatus of claim 8 wherein the finely divided solid is carbon black and wherein the processing mills are pelleting mills.

13. An apparatus for feeding predetermined ratios of finely divided solids to a plurality of processing mills, the apparatus comprising in combination a gas pump, a manifold comprised of a plurality of sections with the sections nearer its inlet being larger in cross-sectional areas than are subsequent sections, an inlet conduit to said pump, a conduit means connecting the outlet of said pump to the inlet of said manifold, a plurality of cyclone separators, a plurality of conduit means spaced along said manifold connecting said manifold respectively with said separators, a separate means for detecting and controlling the pressure drop across each of said separators and operatively connected therewith, the said controlling means being set to control the rate of feed to the said separators responsive to changes in said pressure drop so as to maintain a predetermined pressure drop across the said separators, a return conduit comprised of a plurality of sections, the sections of said return conduit nearer to its exit being larger in cross-sectional area than are previous sections, gas outlet conduits connecting the respective gas outlets of said separators and the said return conduit at spaced positions along said return conduit, a plurality of processing mills, and solids outlet conduits from said separators connected to the inlets of said processing mills, respectively.

14. A flow control means comprising in combination a conduit, means for restricting flow operably connected in said conduit, a fluid-solid separator operably connected in said conduit downstream from said means for restricting flow, means for detecting pressure drop across said fluid-solids separator operably installed therein, and means for controlling said means for restricting flow responsive to change in said detecting means.

15. A method of controlling rate of flow to a fluid-solids separator comprising detecting pressure drop across said separator and regulating the rate of feed to said separator responsive to changes in said pressure drop to maintain a pre-determined value.

References Cited in the file of this patent

UNITED STATES PATENTS

| 884,157 | Hollingsworth | Apr. 7, 1908 |
| 1,468,966 | Herington | Sept. 25, 1923 |
| 1,986,198 | Heid | Jan. 1, 1935 |
| 2,548,332 | Alexander et al. | Apr. 10, 1951 |
| 2,572,862 | Israel | Oct. 30, 1951 |
| 2,580,581 | Niemitz | Jan. 1, 1952 |

OTHER REFERENCES

Perry: "Chemical Engineers' Handbook," McGraw-Hill Book Co., Inc., New York, 1333 (1950).